J. & St. C. GUM.
Wheel-Cultivator.
No. { 1,556, 32,560 }
Patented June 18. 1861.
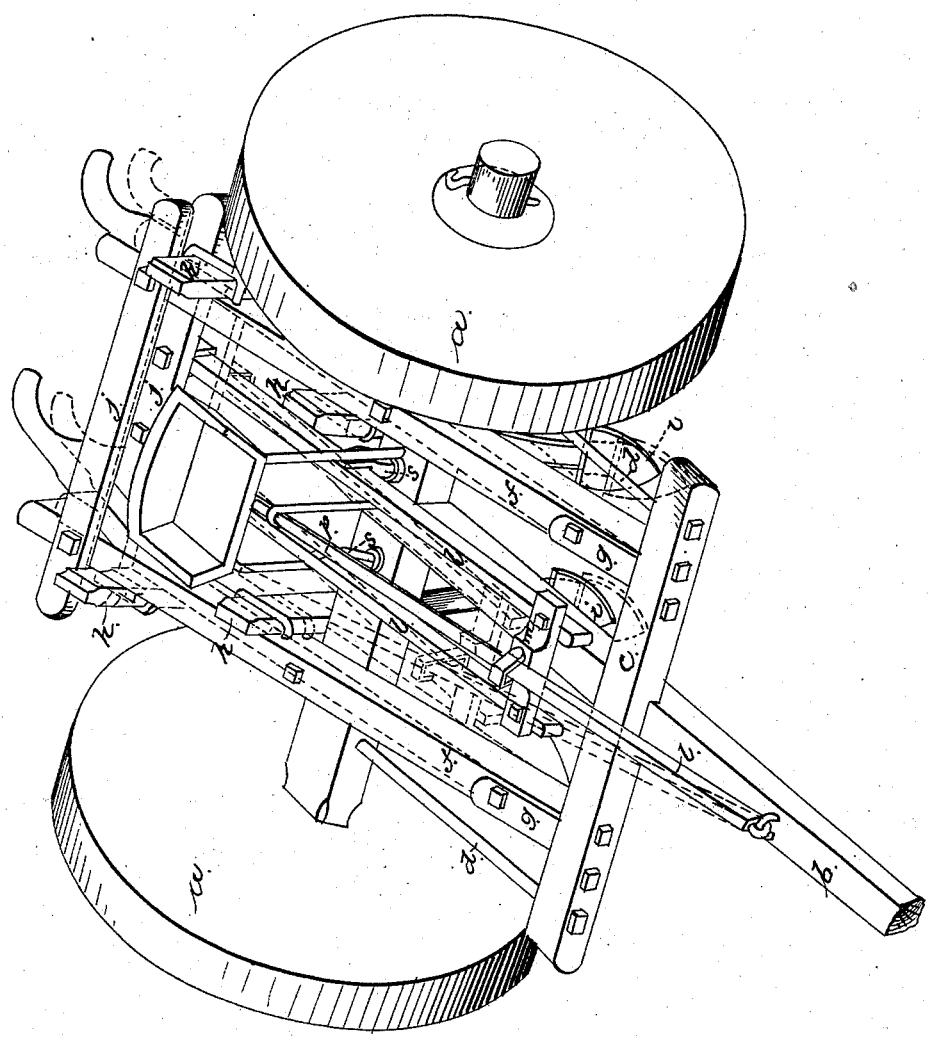

UNITED STATES PATENT OFFICE.

JOSEPH GUM AND ST. CLAIR GUM, OF MARSEILLES, ILLINOIS.

IMPROVEMENT IN CULTIVATORS.

Specification forming part of Letters Patent No. 32,560, dated June 18, 1861.

*To all whom it may concern:*

Be it known that we, JOSEPH GUM and ST. CLAIR GUM, of Marseilles, in La Salle county, and State of Illinois, have invented new and useful Improvements in Cultivators or Corn-Plows; and we declare that the following is a full, true, and exact description of the same, reference being had to the accompanying drawings, making a part of this specification, in which—

Figure 1 is a view in perspective, from near the front, of a machine containing our improvements in black lines, the black lines showing the position of the plows or cultivator-teeth when arranged for transportation from one place to another about a farm.

Cultivators have heretofore been constructed in such a manner as to be used in cultivating both sides of the row of crops at the same time, and also with such arrangements as to enable the operator to change the line of movement of the plows from time to time irrespective of the line of the movement of the machine.

Our invention, while it possesses the capabilities of accomplishing the before-mentioned functions in a satisfactory manner, is also provided with the means by which, through the mechanism heretofore used for the before-mentioned purposes, of also permanently adjusting the plows or cultivator-teeth thereof above the ground, for convenient transportation from place to place about a farm or elsewhere.

The general structure of a machine containing our improvements may be seen in the drawings. It is carried on the two wheels $a$ $a$, and is drawn by a tongue, $b$, or by shafts in its place. Across the tongue is a cross-piece, $c$, made fast to it, and secured to the axle of the machine by metallic rods $d$ $d$, as shown in the drawings, and to the cross-piece $c$ are hinged the pieces $ff$ at $g$ $g$, which hinges are constructed so as to permit a lateral and a vertical motion of them. To the pieces $ff$ are attached the pieces $h$ $h$ $h$ $h$, to the lower ends of which are attached the cultivator teeth or plows $i$ $i$ $i$ $i$. Across the rear ends of the pieces $ff$ are two other cross-pieces, $j$ $j$, secured to them in such manner as to permit the lateral and vertical movements of the pieces $ff$, which carry the pieces $h$ $h$, to which the plows are attached. A seat for the operator is raised on three metallic rods rising up from the axle at a suitable distance above it, and the pieces $h$ $h$ $h$ $h$ are braced by metallic braces rising from near their lower ends to the pieces $ff$. A lever, $l$, is hinged to the tongue, as shown in the drawings, and passes back to the operator's seat. Two other levers, $l'$ $l'$, are pivoted or hinged on two open metallic slotted pieces, which rise from near the middle of the axle and are marked $s$ $s$, and extend from near the cross-piece $c$ back under the cross-pieces $j$ $j$, where they pass through two closed slotted pieces of metal that depend from the lower one of the cross-pieces $j$, and which turn laterally in their connection with said cross-piece. The lever $l$, which is hinged to the tongue, is carried back through a closed piece of slotted metal, $k$, which is made fast to the cross-piece $m$, across the front ends of the levers $l'$ $l'$, and whenever the operator may desire he may, by pressing the lever $l$ to the right or left, cause the several plows to be moved in an opposite direction, and by pressing down upon said lever he will raise the plows up from the earth. A metallic rod, $v$, is raised from the center of the axle up to a convenient distance in front of and in close proximity to the driver's seat, and it is turned over at the top in the form of a hook; and whenever it is desired to transport the machine from field to field or elsewhere the operator brings the lever $l$ down and carries it under the hook of the rod $r$.

Having thus stated our invention, what we claim therein as new, and desire to secure by Letters Patent, is—

The combination of the lever $l$, the levers $l'$ $l'$, to control the lateral and vertical movements of the cultivators while in use, with the upright hooked metallic rod $r$, by use of which to adjust the cultivators from the ground for removing the machine from place to place when the machine is not used in cultivation, substantially as described.

In testimony of which invention we hereunto set our hands.

JOSEPH GUM.
ST. CLAIR GUM.

Witnesses:
W. E. MAKEEVER,
STEPHEN M. GUM.